Oct. 30, 1962

H. G. PRYOR 3,061,029

COUPLING MECHANISM FOR TRACTORS

Filed Dec. 31, 1958

INVENTOR:
HERBERT GEORGE PRYOR
By
Richardson, David and Nardon
ATTY'S

Oct. 30, 1962 H. G. PRYOR 3,061,029
COUPLING MECHANISM FOR TRACTORS
Filed Dec. 31, 1958 3 Sheets-Sheet 2

INVENTOR:
HERBERT GEORGE PRYOR
By
Richardson, David and Nordon
ATTY's

Oct. 30, 1962 H. G. PRYOR 3,061,029
COUPLING MECHANISM FOR TRACTORS
Filed Dec. 31, 1958 3 Sheets-Sheet 3

INVENTOR:
HERBERT GEORGE PRYOR
By
Richardson, David and Nerdon
ATTY's.

United States Patent Office 3,061,029
Patented Oct. 30, 1962

3,061,029
COUPLING MECHANISM FOR TRACTORS
Herbert George Pryor, Loft Hall, Navestock, Romford, England
Filed Dec. 31, 1958, Ser. No. 784,272
Claims priority, application Great Britain Mar. 3, 1958
3 Claims. (Cl. 180—12)

This invention relates to agricultural and like tractors and has for its object to provide means whereby the power units of two tractors may be coupled in tandem for carrying out heavy draft work which normally the conventional type of tractor employed by farmers or the like could not perform when used as a single power unit driven vehicle.

By means of the present invention it is possible for the power unit and rear driving wheels of one tractor to be coupled to the forward end of the chassis of another tractor. Thus it is possible by means of the present invention for two conventional tractors to have their front dirigible wheels removed so that the driving wheels of the forward unit can act as auxiliary driving wheels as well as being dirigible for steering purposes by the use of fluid pressure actuated steering movement applying means mountable upon the chassis of one of the two vehicles to be coupled and provided with means connecting it effectively to the other tractor, e.g. to the rear axle housing of such vehicle to impart dirigible movements to the rear wheels. That is to say, the present invention is concerned primarily with an improved coupling mechanism for connecting and dirigibly controlling the angular relation between two individually power driven tractors and in accordance therewith the present invention embodies a steering member, means to support said steering member by one of said tractors for rotation about a vertical axis, hydraulic jacks arranged as links operatively connected each at one end to said rotatable steering member and arranged as fore and aft jacks and at their other ends connected respectively to the front and rear tractors, and means to feed hydraulic fluid pressure to said hydraulic jacks to vary simultaneously their effective lengths.

To provide for lateral tilting of the front tractor unit the said beam at its rear end is supported in brackets or lugs integral with the lower turntable element and diametrically opposed on the turntable element.

In order that the invention may be clearly understood and readily carried into effect, drawings are appended hereto illustrating an embodiment thereof; wherein.

Figure 1:
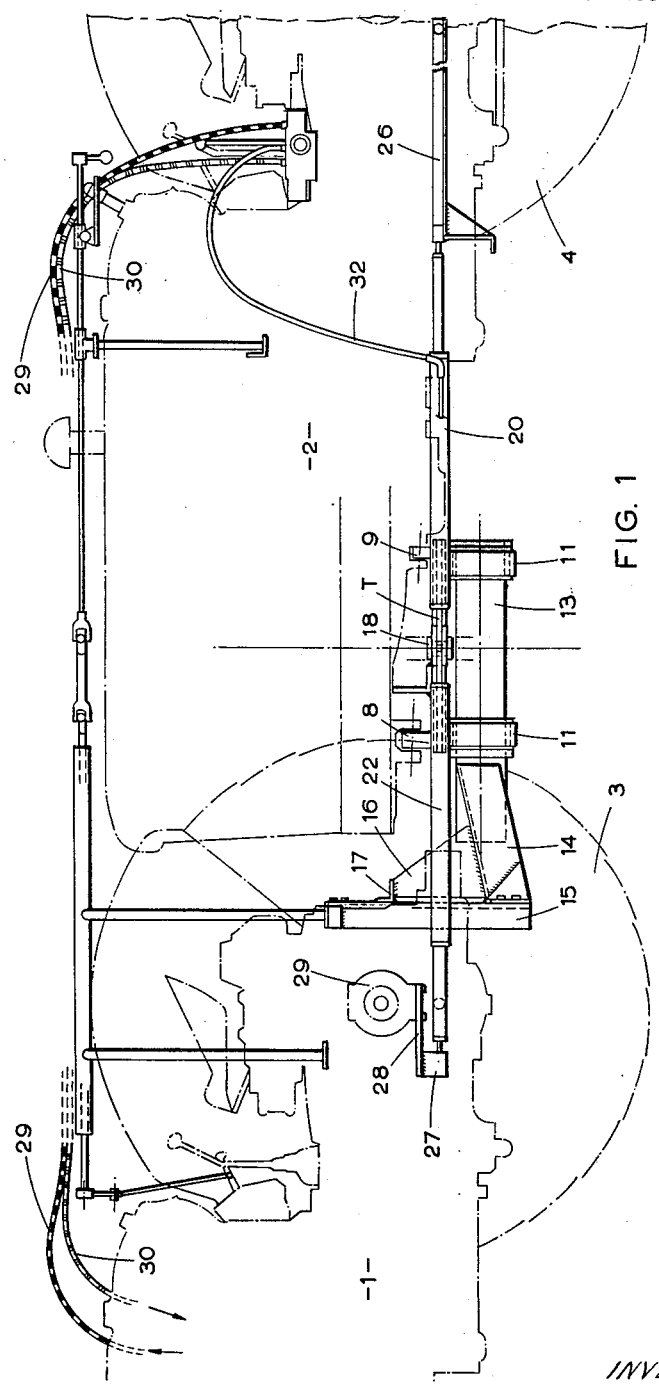
FIGURES 1 and 2 show in side elevation and plan the steering means indicating the fore and aft tractors together, the latter being shown in broken lines.

Referring to the drawings the fore and aft tractors are indicated by the reference numerals 1 and 2 respectively and both of these tractors have their front steering wheels removed so that the rear driving wheels 3 of the front tractor function as the wheels to be steered, it of course being understood that such steering movements are somewhat different to the conventional arrangement in as much as the whole of the front tractor moves bodily with its rear wheels relatively to the rear tractor during steering and this calls for power actuated means to overcome the heavy load resulting from such an arrangement. The rear driving wheels of the rear tractor are indicated by reference numeral 4.

Figure 2:
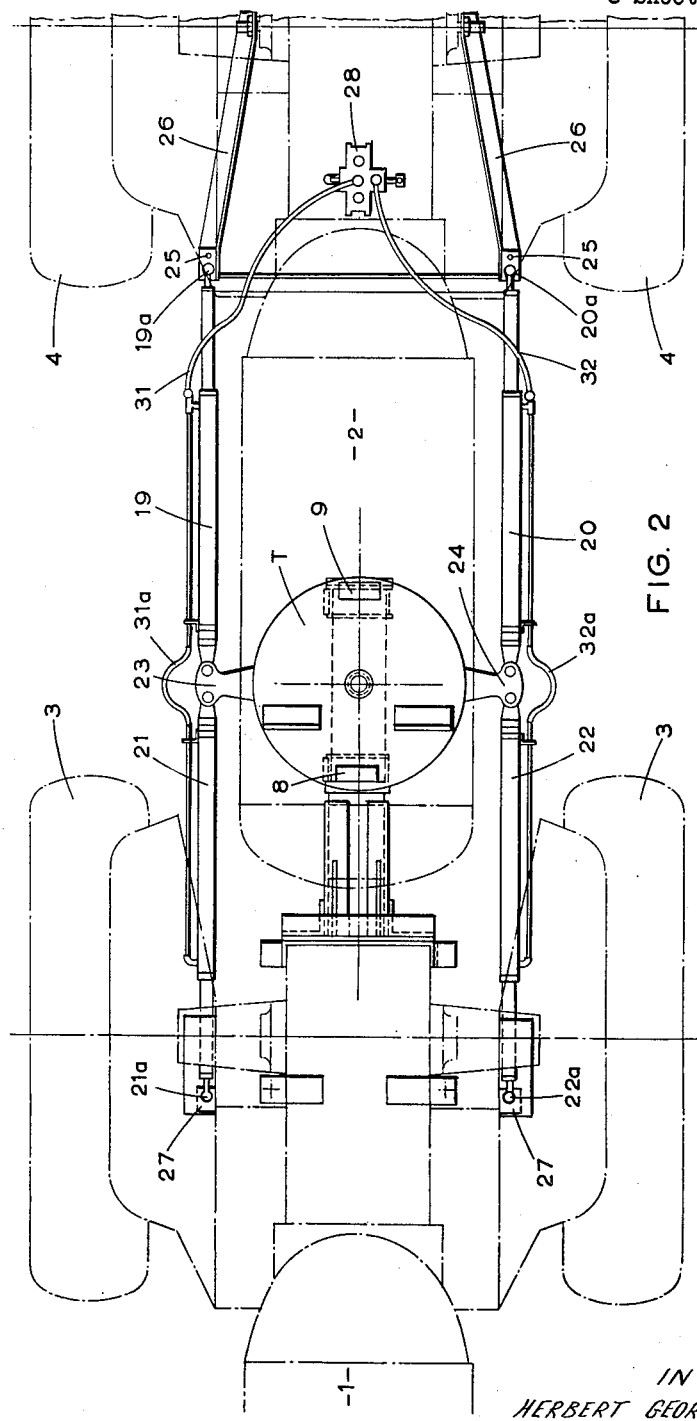
Figure 3:
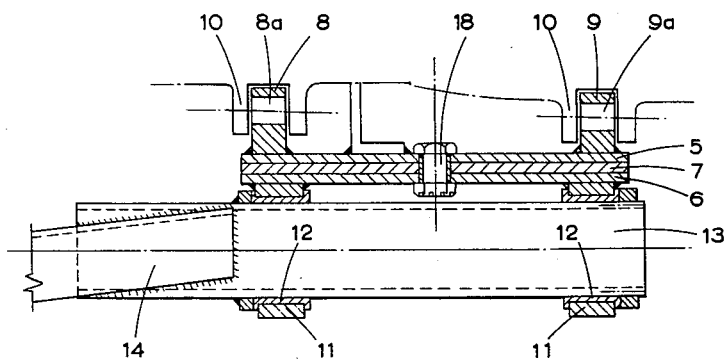
FIGURE 3 is a sectional elevation view of the turntable shown to a larger scale.
Figure 4:
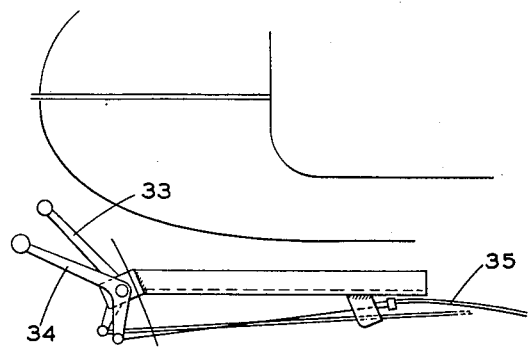
FIGURE 4 shows a convenient means for controlling the throttles of the two power units.

The steering means comprises a turntable structure indicated generally in FIGURE 2 by the letter T and taking the form of an upper disc 5 (see FIGURE 3) carried by the underneath of the rear tractor, a lower disc 6 secured to the front tractor and an intermediate disc 7 to which is connected hydraulic means hereinafter described to impart steering displacement of one tractor relative to the other.

The means for securing the upper and lower discs 5 and 6 to the tractors is adapted to afford lateral tilt of the rear tractor about a longitudinal axis and also a like tilt of the front tractor about a separate longitudinal axis so that both tractors will adapt themselves readily to irregularities of the ground, this being very important when the tractors are used for agricultural and like work over irregular ground. For this purpose upper disc 5 to the base of the rear tractor comprises fore and aft diametrically opposed lugs 8 and 9 receiving journal pins 8a and 9a fixed in pairs of lugs 10 depending from the body or chassis of the rear tractor so that the tractor body is free to rock sideways within practical limits relatively to the turntable. The lower disc 6 has welded to it a pair of collars 11 supported upon journal bushes 12 fixed fore and aft of a longitudinal tubular beam 13 anchored relatively fixedly to a sturdy part of the rear of the front tractor e.g. to the dumb axle of the rear driving wheels 3 or to a vertical plane rear part of the front tractor. For this purpose there is welded to the forward part of the beam 13 a pair of forwardly and downwardly diverging angle bars 14 symmetrical with respect to the axis of the beam 13 and secured to a front plate or pair of verticle angle or channel bars 15 bolted to the rear part of the front tractor, stiffening webs 16 being secured across the members 14 and plate 15 through the medium of a transverse angle bar 17.

It will be appreciated from the foregoing that the lower element 6 of the turntable comprises a rearwardly extended relatively fixed part of the front tractor, which is held against rotation about its axis relative to the front tractor whilst the upper disc 5 is held against rotation about its axis relatively to the rear tractor, the three discs being connected together by a king pin 18 which in addition serves as a steering axis member from which the front tractor extends radially and is traversable laterally through an arc by the hereinafter described hydraulic means to enable the driver occupying the usual seat on the rear tractor to so control the hydraulic means that one tractor is displaced about the steering axis, i.e. pin 18, to change the direction of travel of the coupled tractors.

It will be appreciated that steering is effected by physical lateral displacement of the whole of the front tractor about the king pin 18 relatively to the rear tractor and for this purpose there are provided four hydraulic jacks namely a rear pair 19 and 20 and a front pair 21 and 22, the cylinders of which are pivoted to a diametrically pair of radial arms 23 and 24 formed integral with the intermediate disc 7, whilst the piston rods of the jacks are anchored by ball and socket joints or other suitable universal joints 19a and 20a respectively for the rear jacks to brackets 25 fixed to the front end of a pair of angle bars 26 carried by the rear tractor, and for the front pair of jacks 21 and 22 similarly connected by ball and socket joints 21a and 22a of their piston rods to brackets 27 depending from a pair of brackets 28 fixed to the base of the dumb axle 29 of the rear wheels 3 of the front tractor. The arrangement is such that in order to steer in one direction, e.g. to the left looking at FIGURE 2 the pair of jacks 19 and 21 are energised by being connected through a control valve 28 to a source of hydraulic fluid pressure such as a pump on the front tractor having supply and return lines 29 and 30 (see FIGURE 1), whilst the other pair of jacks 20 and 22 are connected to discharge through the return line 30. Hence, the jacks 19 and 21 will both increase their effective length simultaneously with a decrease in effective length of the jacks 20 and 22 which will result in the front tractor being displaced bodily about the axis of the king pin 18.

The control valve 28 is of any suitable type ported so as to supply the four jacks through the medium of lines 31 and 32 having flexible parts 31a and 32a opposed to the radial arms 23 of the turntable to take care of change in effective length of such lines during steering.

The two vehicles are controlled by a driver accompanying the rear seat of the tractor and consequently there is provided for the driver a pair of throttle control levers 33 and 34 (see FIGURE 5) one of which has the existing standard connection to the engine of the rear tractor and the other of which has a valve and wire connection 35 to the throttle lever of the front tractor.

I claim:

1. A coupling mechanism for connecting and dirigibly controlling the angular relation between two similar and individually power driven tractors, comprising a substantially horizontal non-extensible beam, means at one end of the beam rigidly securing the beam to the rear end of one tractor, means at the other end of said beam forming a tractive couple between said latter tractor and the other tractor at a position beneath said other tractor, a turntable assembly incorporated as part of said tractive couple and comprising a lower element journalled for articulation to and about the longitudinal axis of said beam, an upper element having means by which it is journalled to the underside of the other tractor for articulation about an axis parallel with the longitudinal centre line of said other tractor, a third turntable element interposed between said other two turntable elements, all of said elements being rotatable about a common vertical axis normal to and intersecting said beam, hydraulic fluid pressure actuated means comprising four hydraulic jacks arranged as links operatively connected each at one end to said third turntable member and arranged as a fore pair and an aft pair of jacks and at their other ends connected respectively to the front and rear tractors, one jack of each pair being located at one side of said common axis and the other jack of each pair being located at the other side of said common axis, and selectively controllable valve means to control the flow of hydraulic pressure fluid to said hydraulic jacks.

2. A coupling mechanism for connecting and dirigibly controlling the angular relation between two individually power driven tractors, comprising common to both tractors a vertical axis member defining the axis about which change in angular relationship of the two tractors takes place, a coupling unit in the form of a pair of bars rigidly secured at one end to the rear part of one of said tractors, a beam integral with and extending horizontally from the other end of said bars and disposed beneath the other tractor parallel with the longitudinal centre line of the tractor receiving said bars, a turntable assembly comprising a lower plate element journalled for articulation to and about the longitudinal axis of said beam, an upper plate element having means by which it is journalled to the underside of the other tractor for articulation about an axis parallel with the longitudinal centre line of said other tractor, a third plate element interposed between said upper and lower plate elements and means connecting all of said elements together for rotation about a common vertical axis, a first pair of substantially endwise aligned hydraulic jacks forming a linkage from one side of said third plate element to a point on each of the tractors, a second pair of substantially endwise aligned hydraulic jacks forming a linkage from the other side of said third plate element to a point on each tractor which is laterally spaced from one of the first-named points, and controllable means to feed hydraulic fluid pressure selectively to said hydraulic jacks to increase and decrease the effective lengths of said linkages to steer one tractor relative to the other.

3. A coupling and steering mechanism for interconnecting two individually power driven tractors, comprising common to both tractors a king pin having a vertical axis, an upper turntable element and a lower turntable element each journalled on said king pin, means including pivot means connecting one tractor to said upper turntable element while permitting lateral tilting of such tractor relative to said upper turntable element, means including pivot means connecting the other tractor to the lower turntable element while permitting lateral tilting movement of said other tractor relative to said lower turntable element, a pair of hydraulic jacks each pivoted at one end to laterally spaced points of one of the tractors at opposite sides of the longitudinal axis of said tractor, a further pair of jacks each pivoted at one end to laterally spaced points of the other tractor at opposite sides of the longitudinal axis of said other tractor, means connecting their other ends pivotally to diametrically opposite sides of anchorage means journaled on said king pin, and controllable means to feed hydraulic pressure fluid selectively to said hydraulic jacks for steering one tractor relative to the other.

References Cited in the file of this patent

UNITED STATES PATENTS

| | | |
|---|---|---|
| 1,079,475 | Davis | Nov. 25, 1913 |
| 1,377,497 | Mattson | May 10, 1921 |
| 1,607,962 | Patitz | Nov. 23, 1926 |
| 2,347,882 | Choate et al. | May 2, 1944 |
| 2,594,695 | Storey | Apr. 29, 1952 |
| 2,614,644 | Gustafson | Oct. 21, 1952 |
| 2,638,998 | Rockwell | May 19, 1953 |
| 2,727,581 | Wright | Dec. 20, 1955 |
| 2,833,557 | Palmiter | May 6, 1958 |

FOREIGN PATENTS

| | | |
|---|---|---|
| 605,826 | France | Feb. 26, 1925 |